(12) United States Patent
Hirzmann

(10) Patent No.: US 7,866,858 B2
(45) Date of Patent: Jan. 11, 2011

(54) ASSEMBLY FOR THE ILLUMINATED DISPLAY OF A LOGO

(75) Inventor: Guido Hirzmann, Sailauf (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 447 days.

(21) Appl. No.: 11/973,941

(22) Filed: Oct. 11, 2007

(65) Prior Publication Data

US 2008/0090031 A1 Apr. 17, 2008

(30) Foreign Application Priority Data

Oct. 12, 2006 (DE) .................. 10 2006 048 347
Mar. 2, 2007 (DE) .................. 10 2007 010 328

(51) Int. Cl.
*B60Q 1/26* (2006.01)
(52) U.S. Cl. ...................... 362/488; 362/487
(58) Field of Classification Search .......... 362/487, 362/489, 496, 540
See application file for complete search history.

(56) References Cited

U.S. PATENT DOCUMENTS

| | | | |
|---|---|---|---|
| 3,200,524 A * | 8/1965 | Hendrickson | 362/496 |
| 6,190,026 B1 | 2/2001 | Moore | |
| 6,729,055 B2 | 5/2004 | Chou | |
| 6,735,893 B2 * | 5/2004 | Wolf | 40/591 |
| 7,255,464 B2 * | 8/2007 | Barros et al. | 362/494 |
| 2004/0213007 A1 * | 10/2004 | Portillo | 362/487 |
| 2005/0007752 A1 | 1/2005 | Tsai et al. | |
| 2006/0023468 A1 * | 2/2006 | Takahashi et al. | 362/555 |
| 2006/0213007 A1 * | 9/2006 | Palay et al. | 5/81.1 R |
| 2006/0245190 A1 | 11/2006 | Thompson et al. | |

FOREIGN PATENT DOCUMENTS

| | | |
|---|---|---|
| DE | 29609733 | 9/1996 |
| DE | 29820304 | 2/1999 |
| DE | 20018732 | 2/2001 |
| DE | 20215170 | 1/2003 |
| DE | 102004024263 | 3/2005 |
| EP | 0791911 | 8/1997 |
| EP | 1000809 | 5/2000 |
| GB | 2383181 | 6/2003 |
| JP | 2000118320 | 4/2000 |
| JP | 2005215596 | 8/2005 |
| WO | 2005/016698 | 2/2005 |

OTHER PUBLICATIONS

U.S. Appl. No. 09/439,511, filed Nov. 12, 1999 entitled "Emblem for a Motor Vehicle".

* cited by examiner

*Primary Examiner*—David V Bruce
(74) *Attorney, Agent, or Firm*—Tarolli, Sundheim, Covell & Tummino LLP

(57) ABSTRACT

An assembly for the illuminated display of a logo (12) in a motor vehicle includes a support (14) and at least one light source (24) which is arranged behind or adjacent to the support (14). The logo (12) can be represented by means of an emblem (10), particularly an opaque emblem.

31 Claims, 16 Drawing Sheets

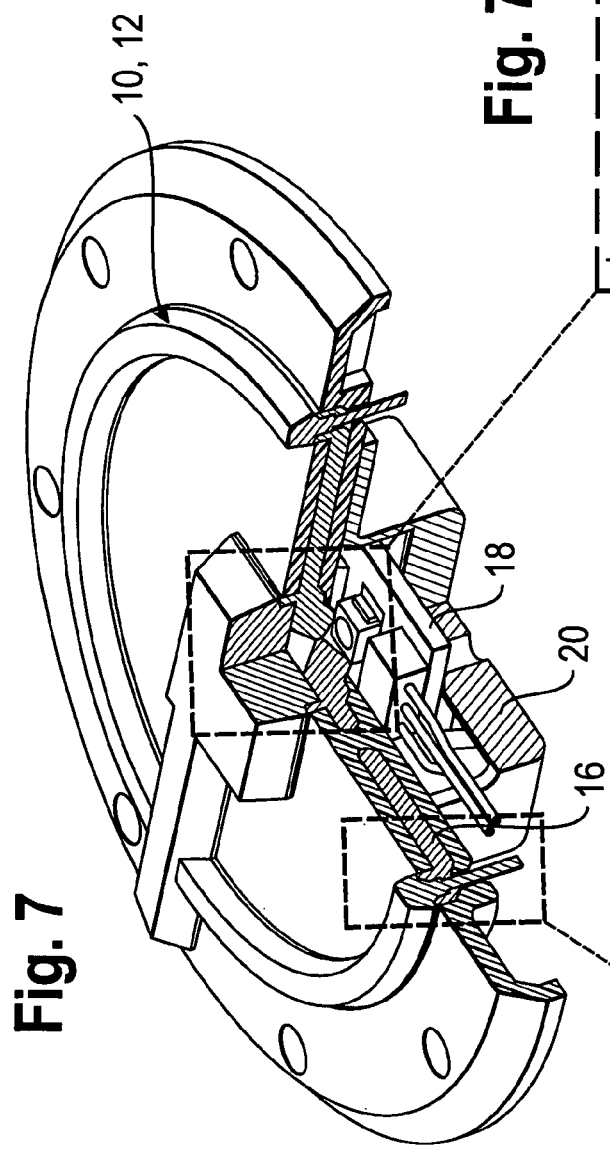
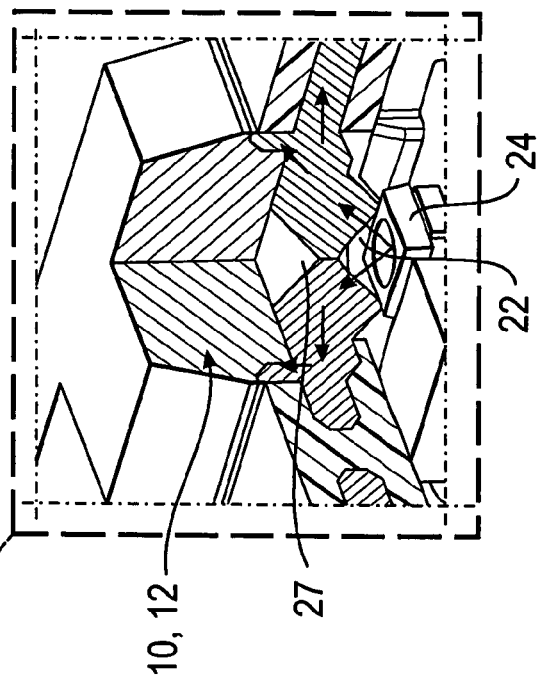
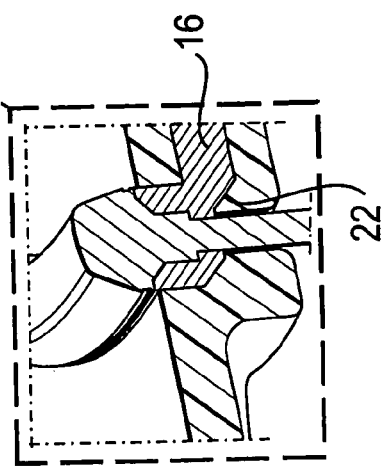
Fig. 7
Fig. 7a
Fig. 7b

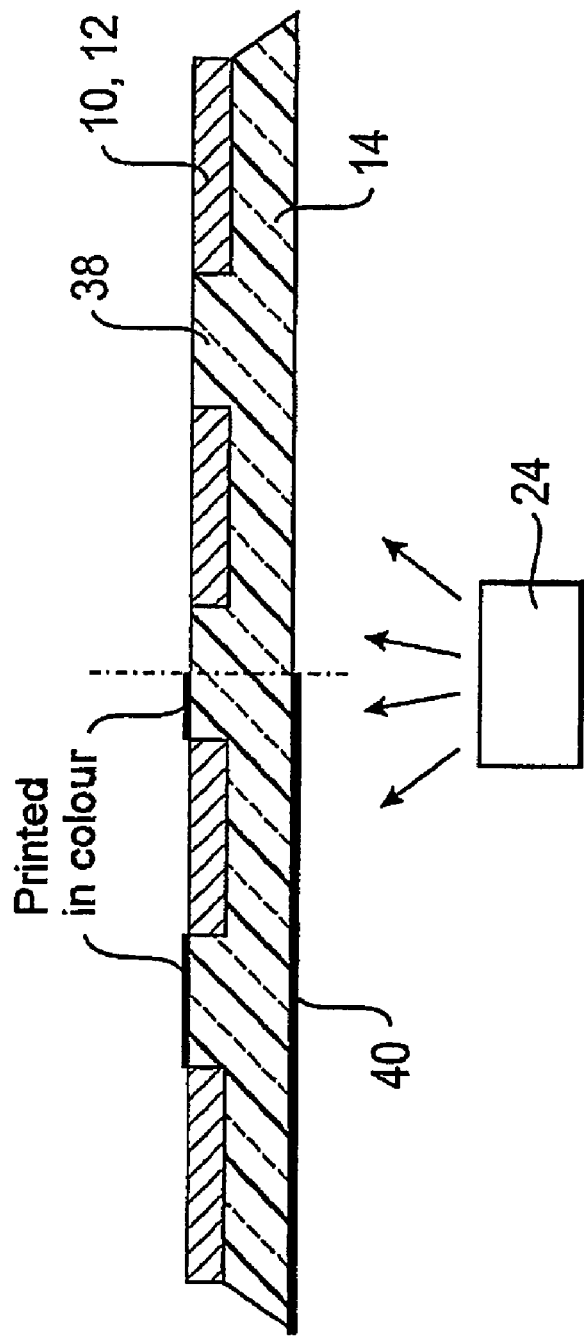
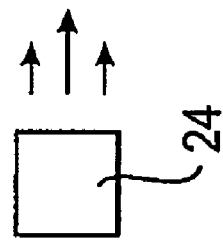

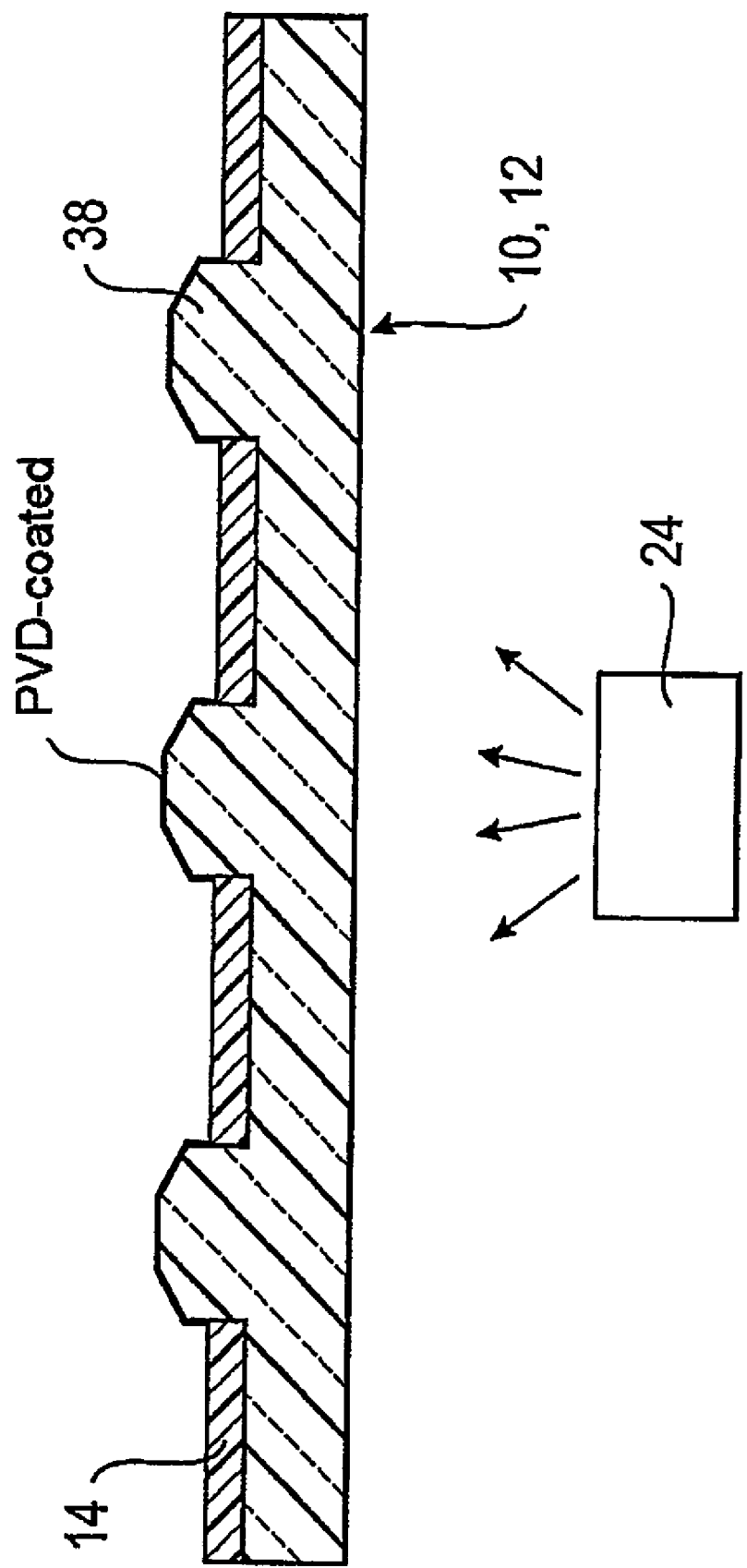

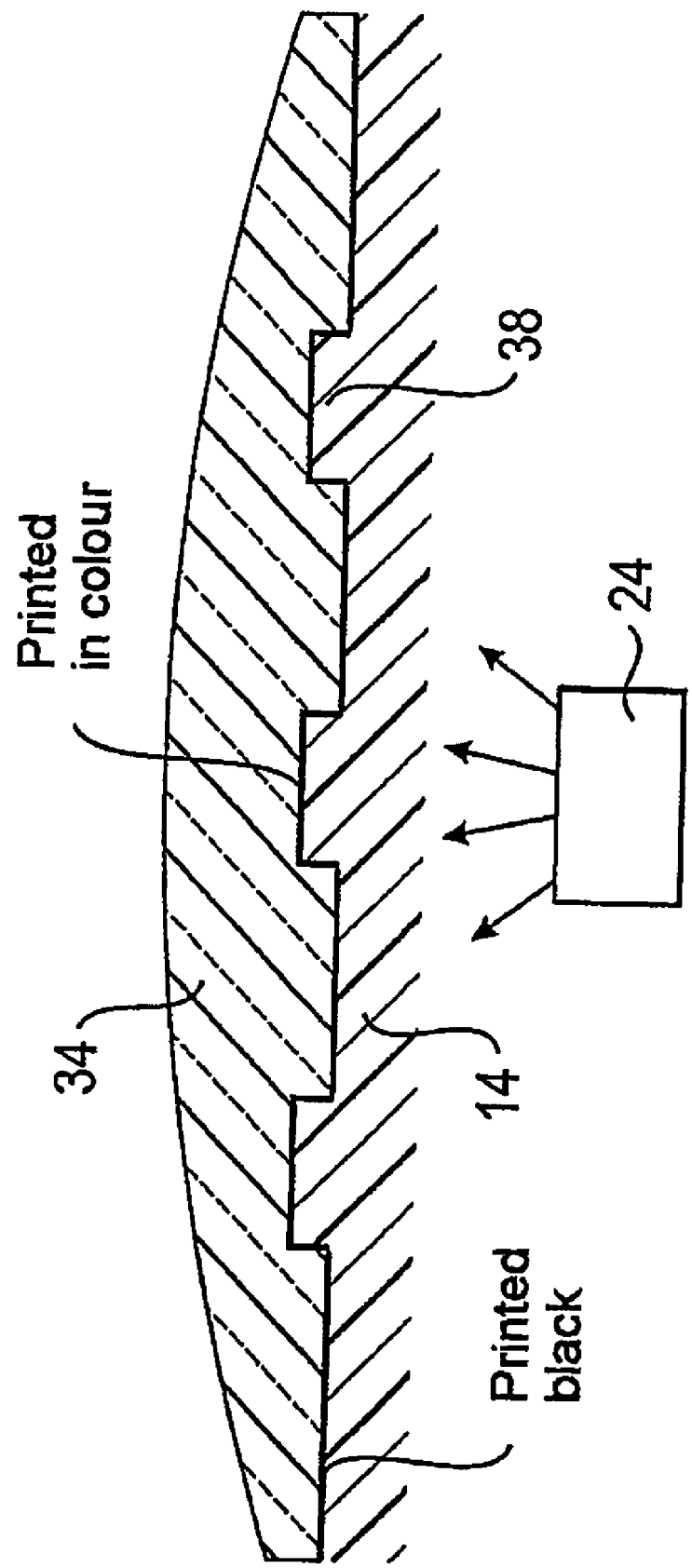

ASSEMBLY FOR THE ILLUMINATED DISPLAY OF A LOGO

TECHNICAL FIELD

The invention relates to an assembly for illuminated display of a logo.

BACKGROUND OF THE INVENTION

The exterior and interior of motor vehicles are usually provided with emblems which display the manufacturer's logo. For this, the logo is either depicted on a flat emblem or the emblem itself has the shape of the logo or at least has structures which represent the logo.

The sense of the quality of a vehicle interior can be accentuated by illuminating a logo arranged therein. Several solutions for illuminating a logo are known from the prior art, which are based on various techniques. DE-U-200 18 732, EP-A-1 000 809, JP-A-2005 215596, U.S. Pat. No. 6,190,026, US-A-2005/0007752, US-A-2006/0023468 and WO-A-2005/016698 are named by way of example.

The mounting and illuminating of a logo on an airbag cover, typically in the central region of the steering wheel, presents certain difficulties. In an illuminating assembly, it has to be understood that neither individual components are to be allowed to become detached from the assembly, nor is the entire assembly allowed to become detached from the cover, if the airbag is activated.

Further requirements for the illuminating assembly are a low weight and a small overall height. In addition, it is desirable that emblems which up until the present have not been illuminated are still able to be utilized for illuminated use, so that no changes to the design and structure of the emblems are necessary.

BRIEF SUMMARY OF THE INVENTION

According to the invention, an assembly for illuminated display of a logo in a motor vehicle includes a support and at least one light source which is arranged behind or adjacent to the support. In most embodiments of the invention, the logo is represented by means of an emblem, particularly an opaque emblem.

BRIEF DESCRIPTION OF THE DRAWINGS

FIG. 7 shows a perspective sectional view of the first assembly;
FIGS. 7a, 7b show detail views of FIG. 7;
FIG. 17 shows a diagrammatic sectional view of a fourth assembly;
FIG. 18 shows a diagrammatic sectional view of a fifth assembly;
and
FIG. 19 shows a diagrammatic sectional view of a sixth assembly.

DETAILED DESCRIPTION OF THE PREFERRED EMBODIMENTS

Figure 1:
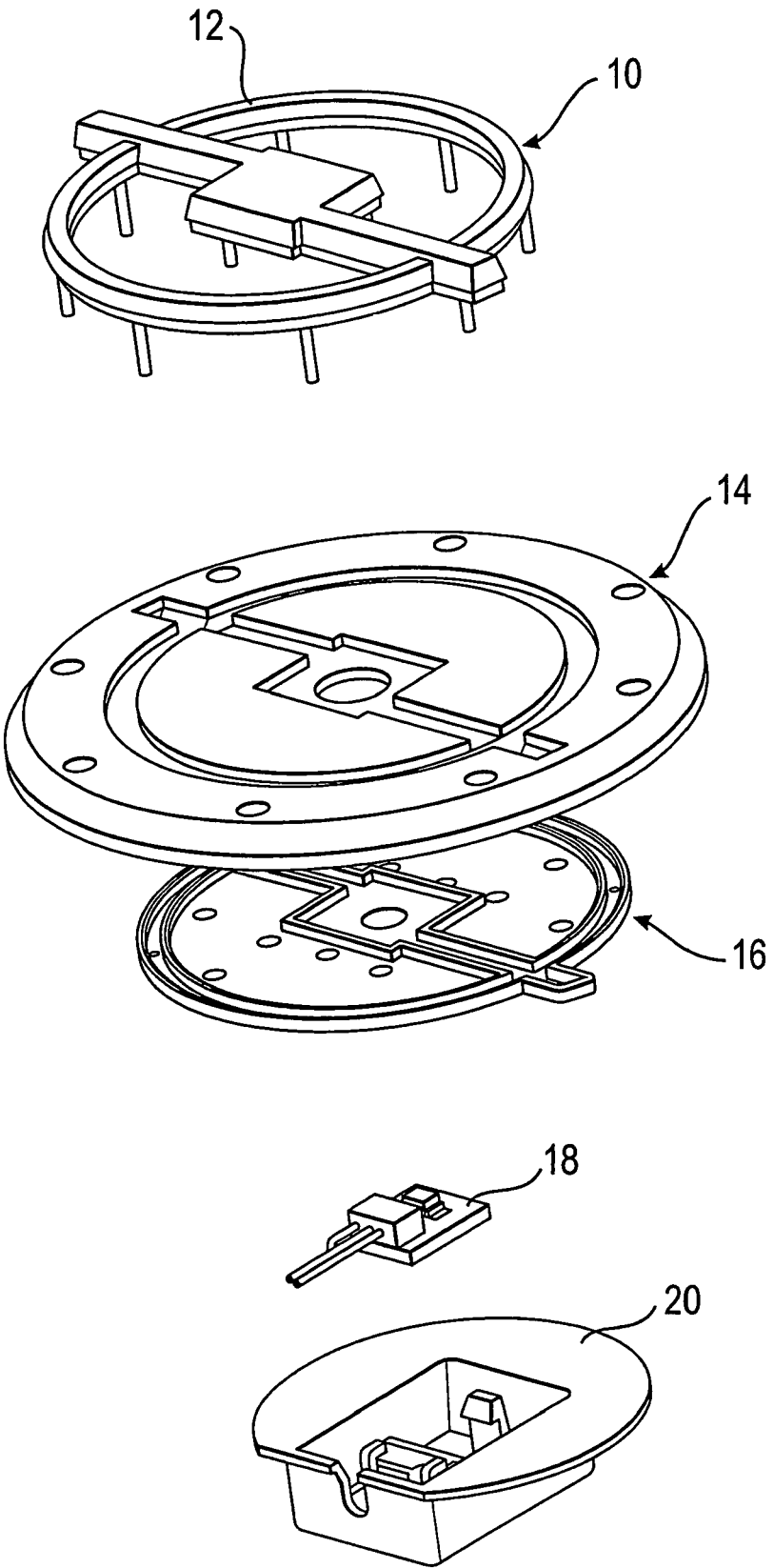
FIG. 1 shows an exploded view of a first assembly.

An assembly according to a first embodiment of the invention is shown in FIGS. 1 to 7. The assembly comprises an opaque emblem 10, which shows, for example, a logo 12 of an automobile manufacturer. The assembly further comprises an opaque plastic support 14, a photoconductor 16, a printed circuit board 18 with electronic components and a base 20.

Figure 2:
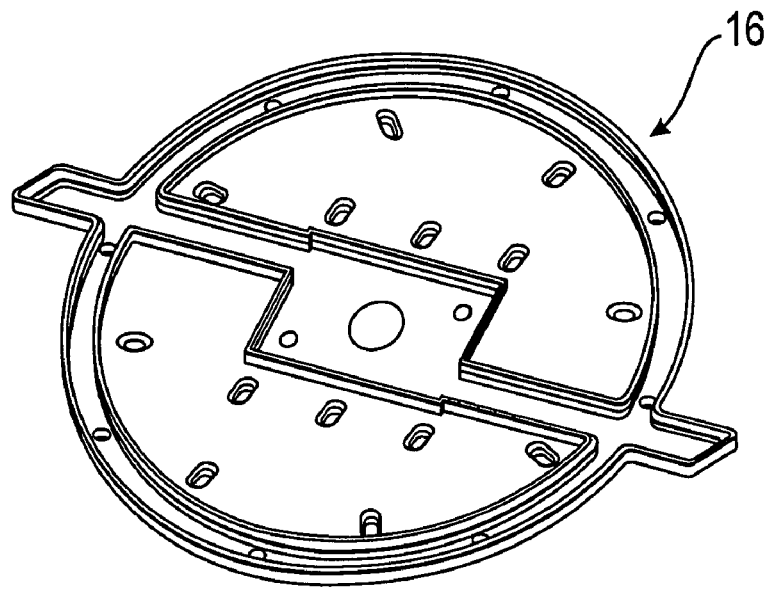
FIG. 2 shows the photoconductor of the first assembly.
Figure 3:
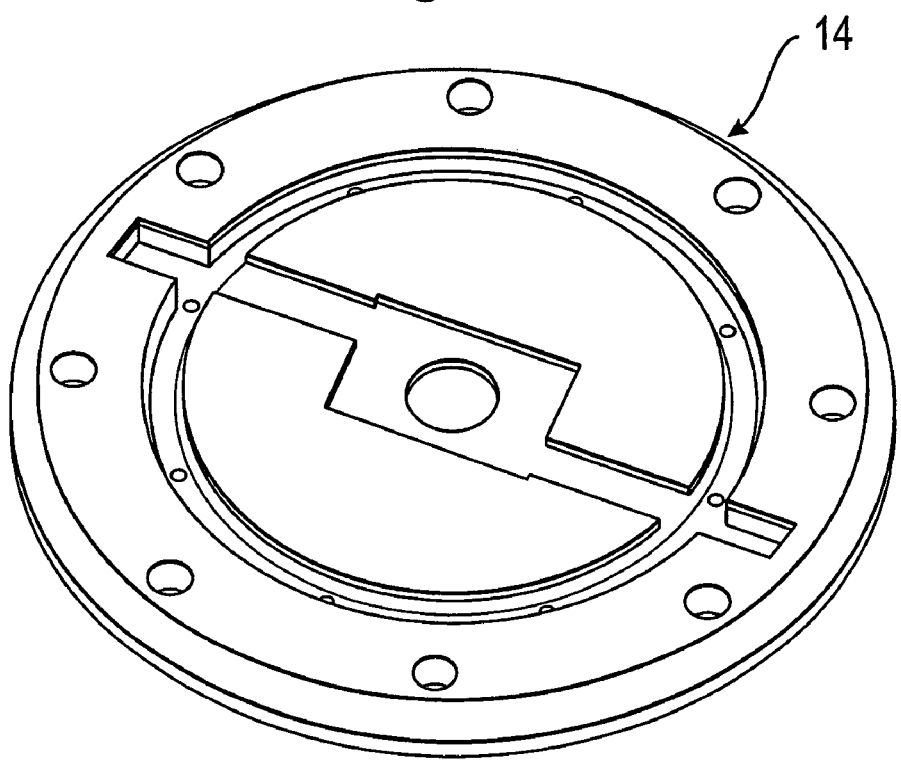
FIG. 3 shows the support of the first assembly.
Figure 4:
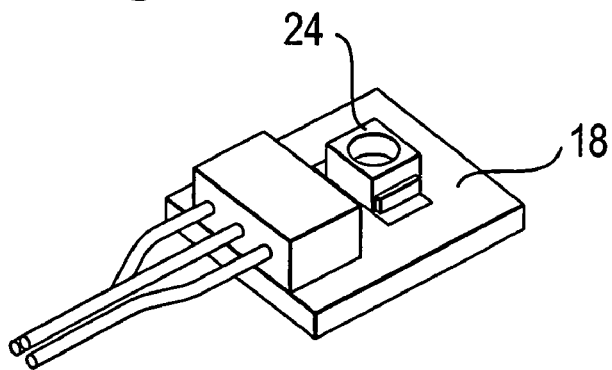
FIG. 4 shows the printed circuit board of the first assembly.
Figure 5:
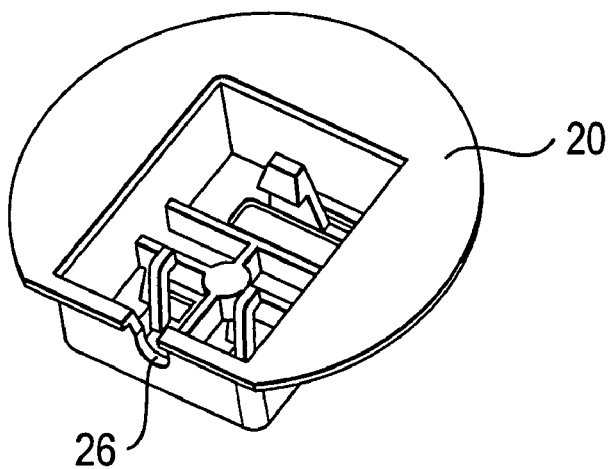
FIG. 5 shows the base of the first assembly.
Figure 6:
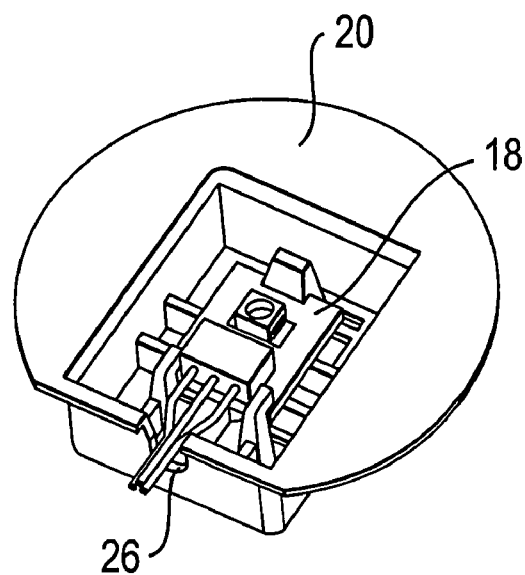
FIG. 6 shows the printed circuit board, held in the base, of the first assembly.

The emblem 10 is a three-dimensional, relief-like solid emblem and, just as in the majority of the following embodiments of the invention, it is substantially identical in structure to emblems as have been used hitherto in non-illuminated manner. The photoconductor 16 shown individually in FIG. 2 is a component matched to the shape of the emblem 10 with specially arranged deflection surfaces 22 having a reflecting polish (see also detail view of FIG. 7b). The photoconductor 16 may basically also be formed from a different material and may possibly have a reflecting coating. The plastic support 14, shown individually in FIG. 3, for the emblem 10 is produced by injection-molding around the photoconductor 16, preferably by a two-component injection molding process, if the photoconductor 16 is a plastic part, too. SMD components (surface mounted devices) are arranged on the printed circuit board 18 (see FIG. 4), particularly a light-emitting diode (LED) 24 as a light source. A recess 26 is provided for the wiring of the printed circuit board 18 in the base 20 which holds and protects the printed circuit board 18 (see FIGS. 5 and 6).

The assembly is shown in the assembled state in FIG. 7. The printed circuit board 18 is arranged so that the LED 24 lies centrally under the emblem 10 and the photoconductor 16. The uniform coupling of the light emitted from the LED 24 into the photoconductor 16 is assisted by a cone 27 of the photoconductor 16 acting as a diffuser, which is arranged directly over the LED 24.

Figure 7C:
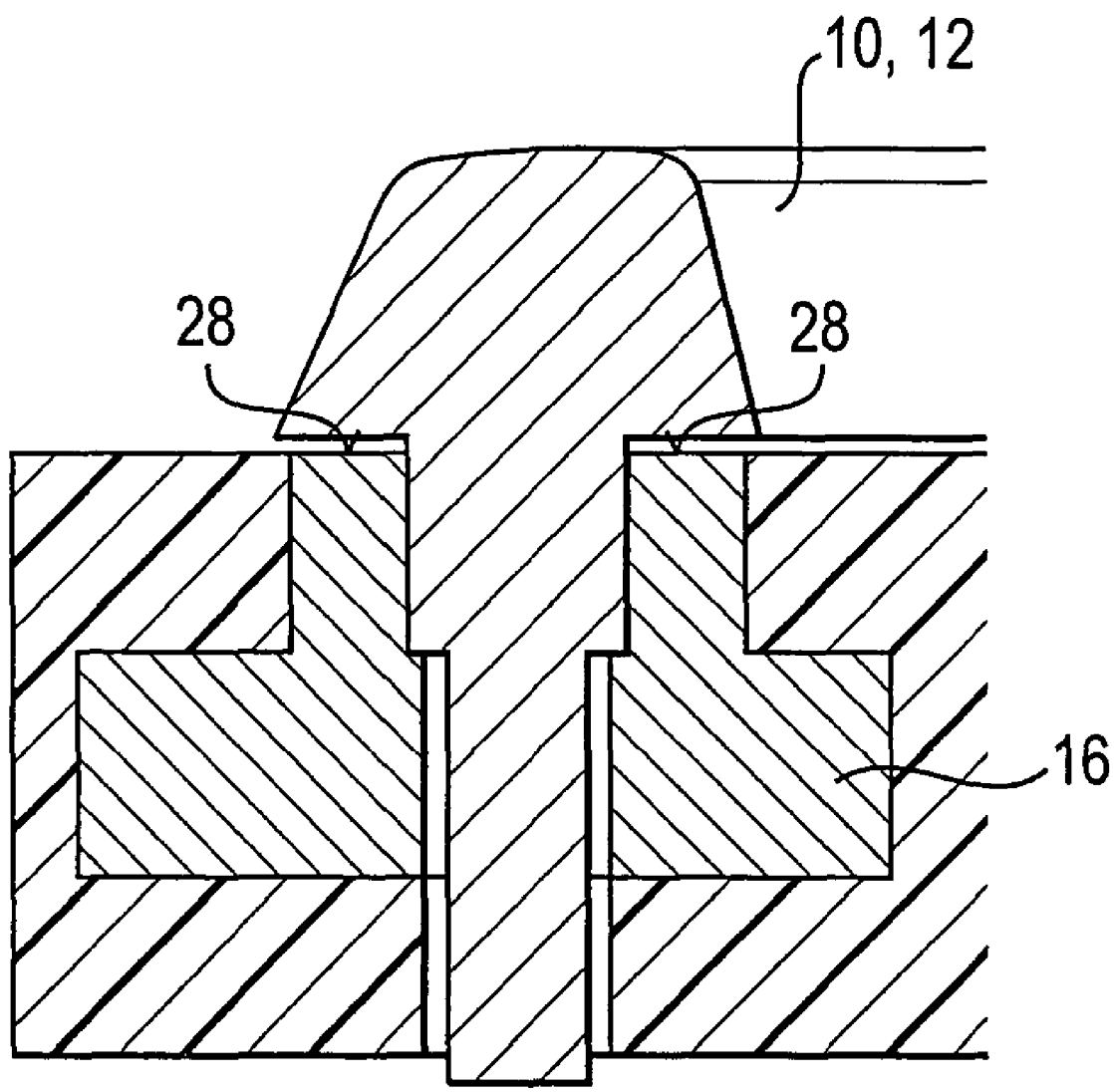
FIG. 7c shows a detail view, in section, of the light outlet region of the first assembly.
Figure 8:
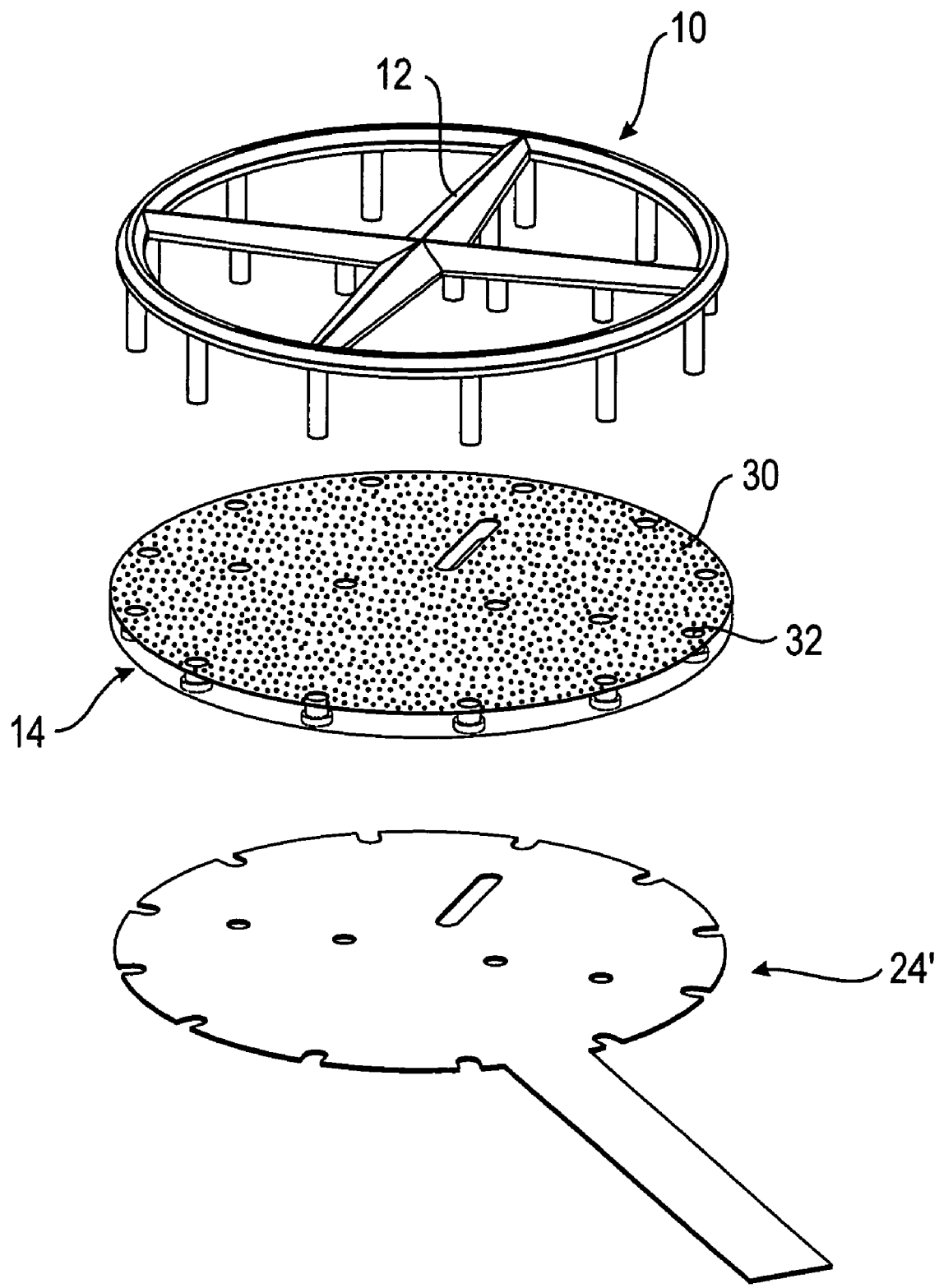
FIG. 8 shows an exploded view of a second assembly.
Figure 9:
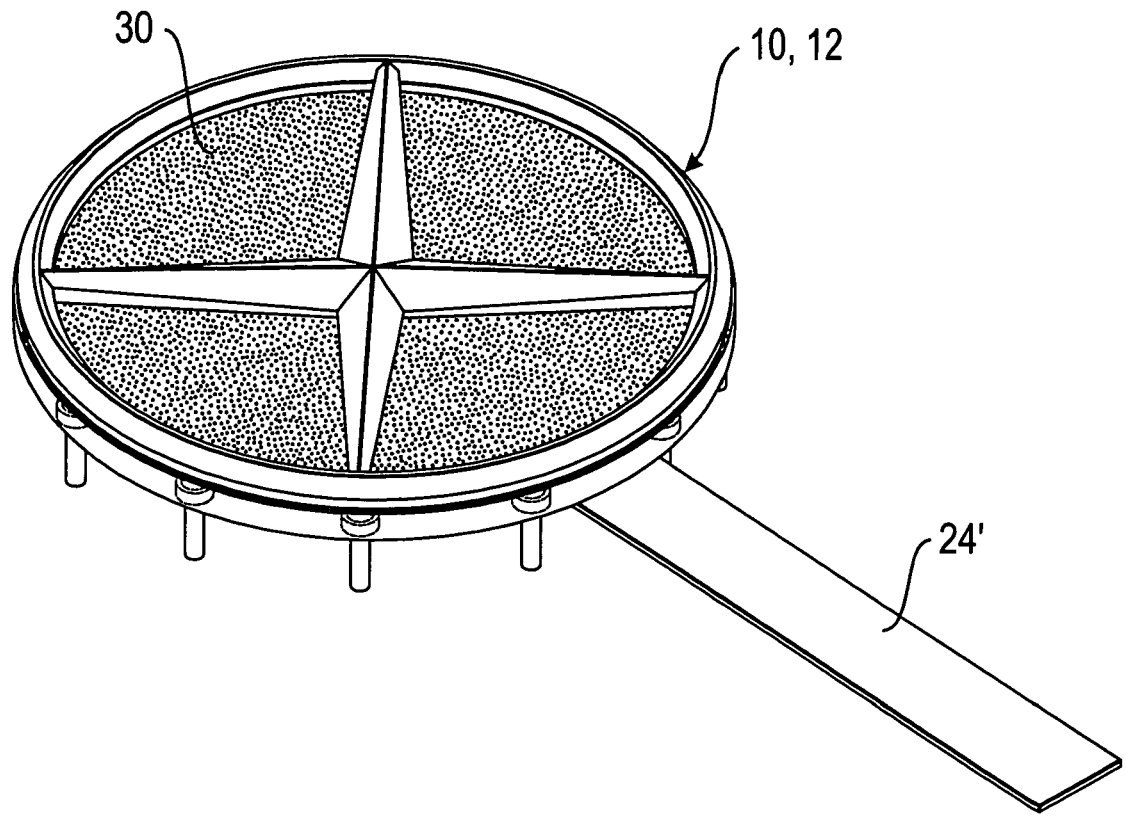
FIG. 9 shows the second assembly in the assembled state.
Figure 10:
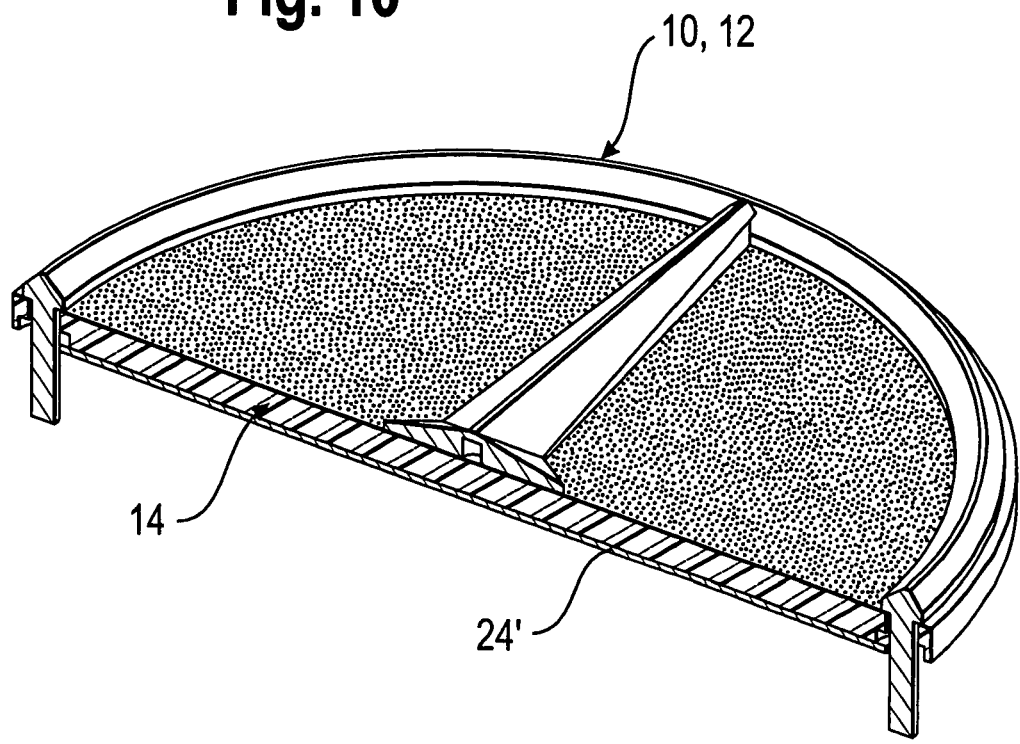
FIG. 10 shows a perspective sectional view of the assembled second assembly.
Figure 11:
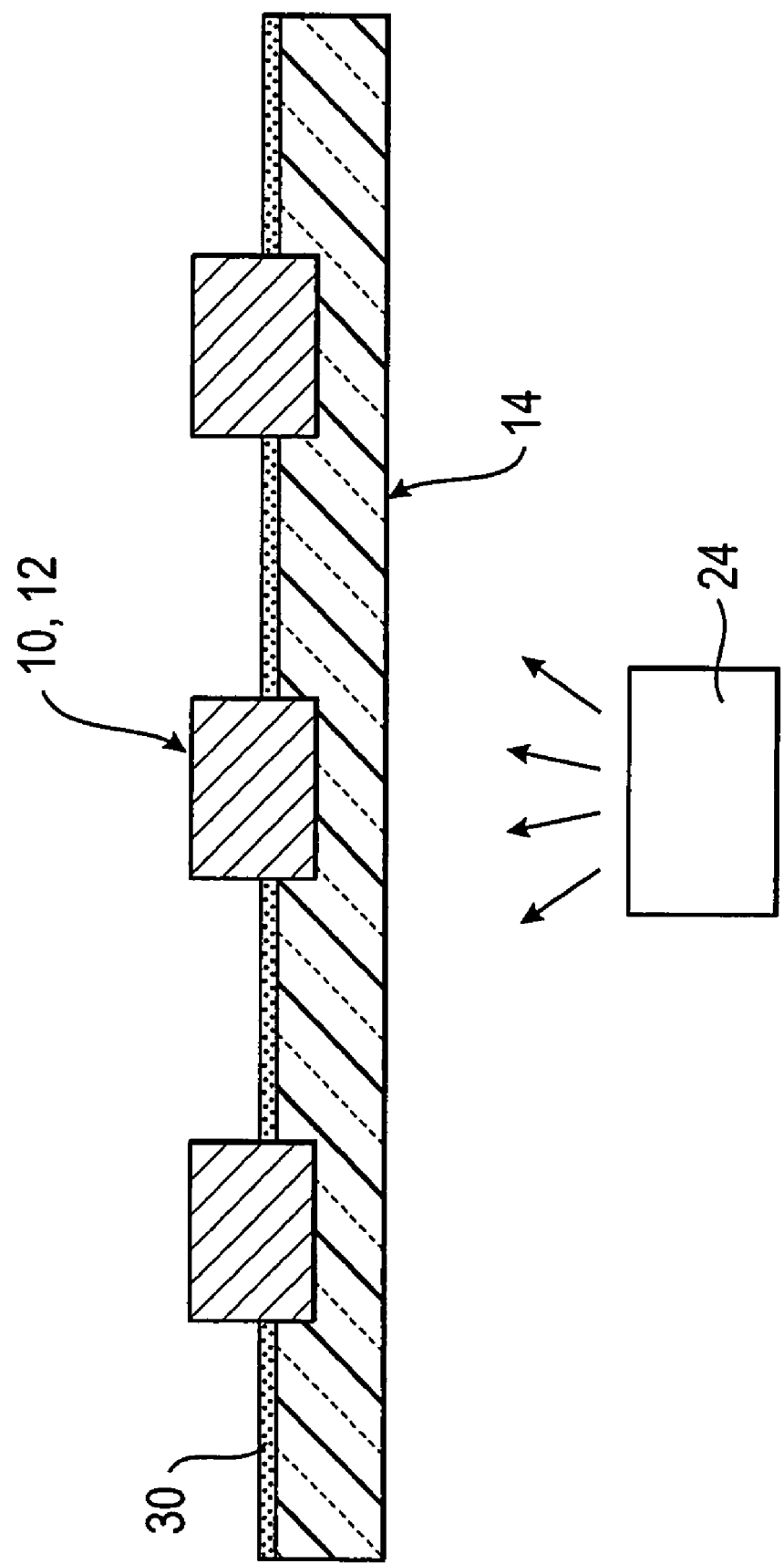
FIG. 11 shows a diagrammatic sectional view of the second assembly.
Figure 12:
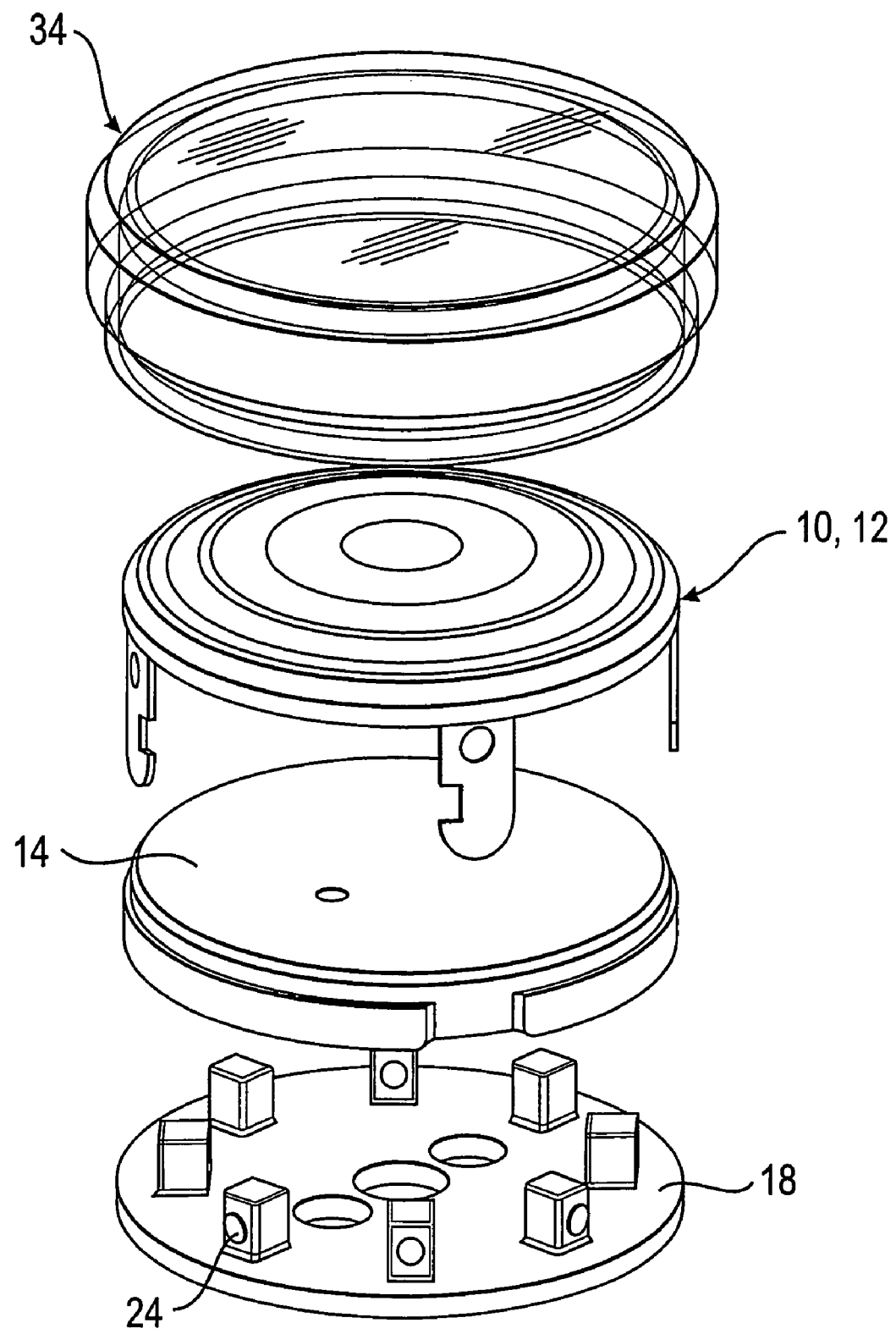
FIG. 12 shows an exploded view of a third assembly.
Figure 13:
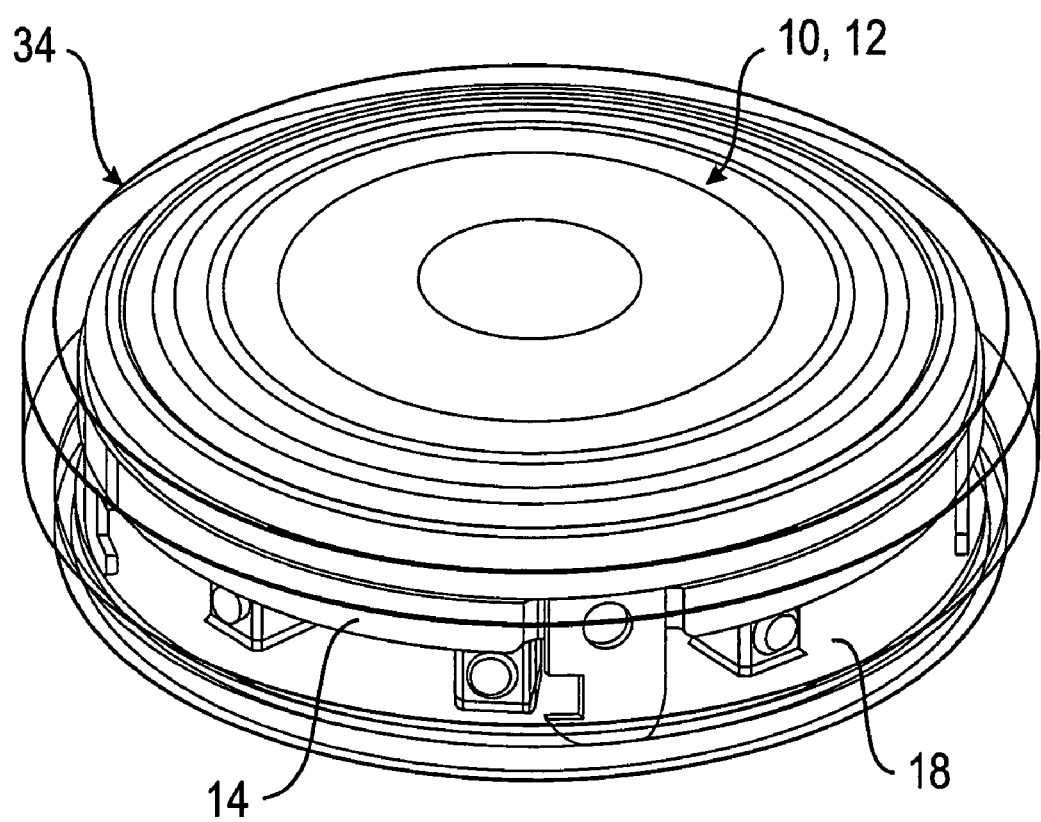
FIG. 13 shows the third assembly in the assembled state.

As can be seen from FIG. 7 and the detail views of FIGS. 7a and 7b, the photoconductor 16 is constructed so that the coupled-in light is directed to the rear side of the emblem 10. This is made possible by the deflection surfaces 22 on which the coupled-in light is reflected. The photoconductor 16 has light outlet areas 28 which lie opposite the rear edge regions of the emblem 10 but do not project over them laterally (see FIG. 7c). As the edge regions of the emblem 10 do not lie directly on the photoconductor 16, the emblem 10 is therefore illuminated indirectly on the rear side. A lighting effect is produced here which is comparable with a corona.

Like the emblem which was hitherto not illuminated, the assembly is fastened on the airbag cover of the steering wheel by means of the pins of the emblem 10. To do this, after insertion into corresponding openings of the airbag cover, the pins are welded on the rear side of the cover, e.g. by ultrasonic welding.

An assembly according to a second embodiment of the invention is illustrated in FIGS. 8 to 11. The assembly comprises a three-dimensional, relief-like solid emblem 10, an electroluminescence foil 24' as the light source and a transparent plastic support 14. The use of electroluminescence foils for illuminating emblems per se is known (see, for example, DE-U-298 20 304), for which reason the layer structure and the electrical stimulation of the foil 24' is not entered into in further detail. The foil 24' and the support 14 are coordinated with the emblem 10 as regards shape, fastening bores etc.

The surface of the support 14 facing the emblem 10 is coated with an enamel 30 which is opaque per se. However, the enamel layer has gaps 32 so that light can pass through the support 14 at these places. The gaps 32 can be produced by means of a laser after the support 14 is coated. Basically any desired structures are able to be produced, e.g. fine honeycomb structures for a uniform illumination, or larger gaps 32 for a systematic illumination of a particular zone.

A third embodiment of the invention is illustrated in FIGS. 12 to 16. The assembly shown in an exploded view in FIG. 12 and in the assembled state in FIGS. 13 and 14 comprises an opaque printed circuit board 18 equipped, inter alia, with LEDs 24, an opaque support 14, an opaque emblem 10 and a transparent plastic injection-molded member 34 over the emblem 10.

Figure 14:
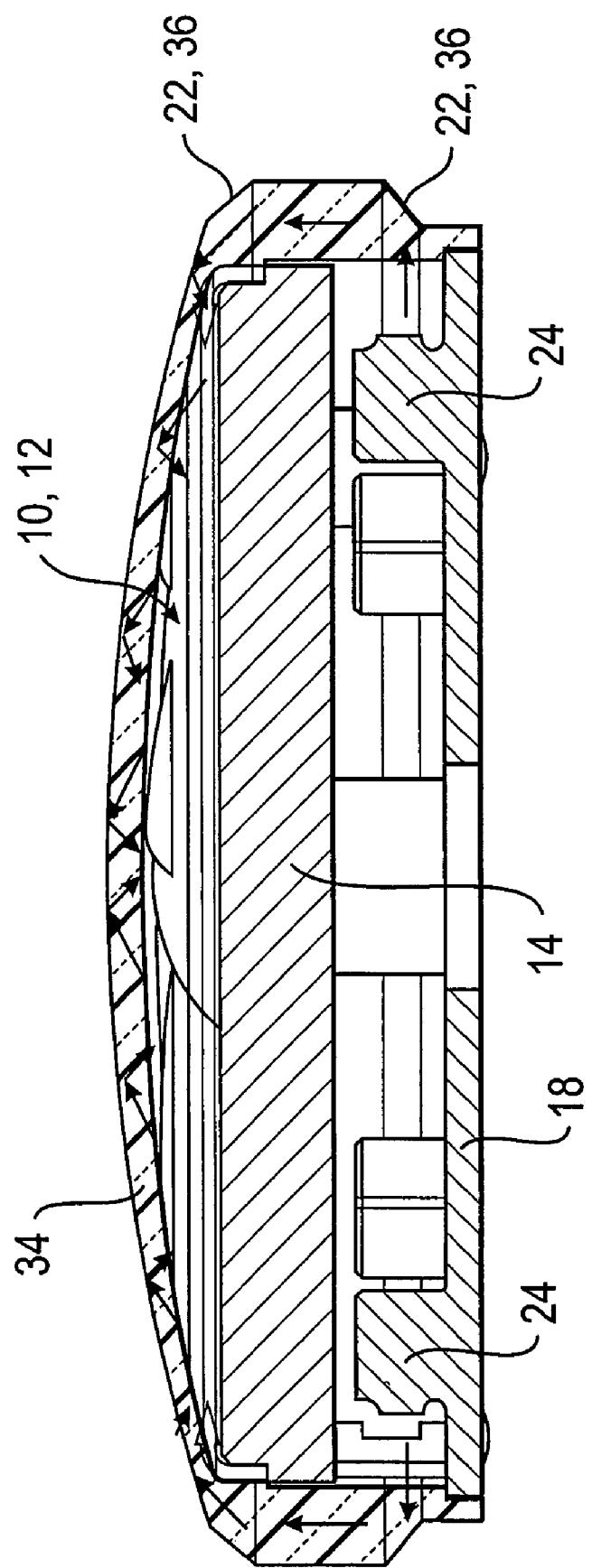
FIG. 14 shows a sectional view of the third assembly.
Figure 15:
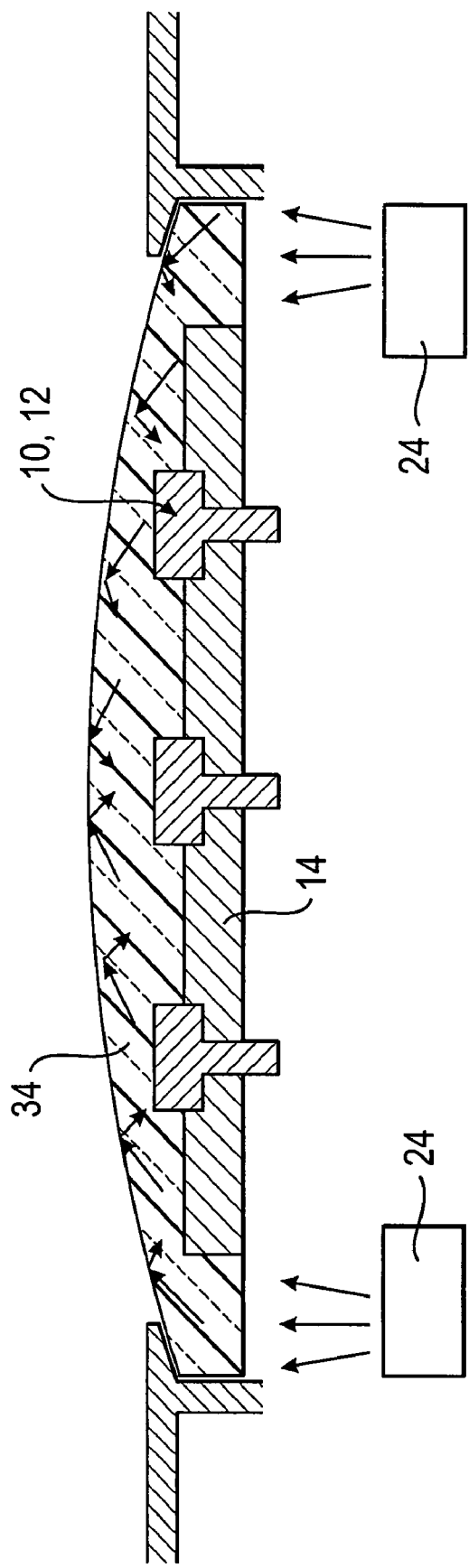
FIG. 15 shows a diagrammatic sectional view of the third assembly.
Figure 16:
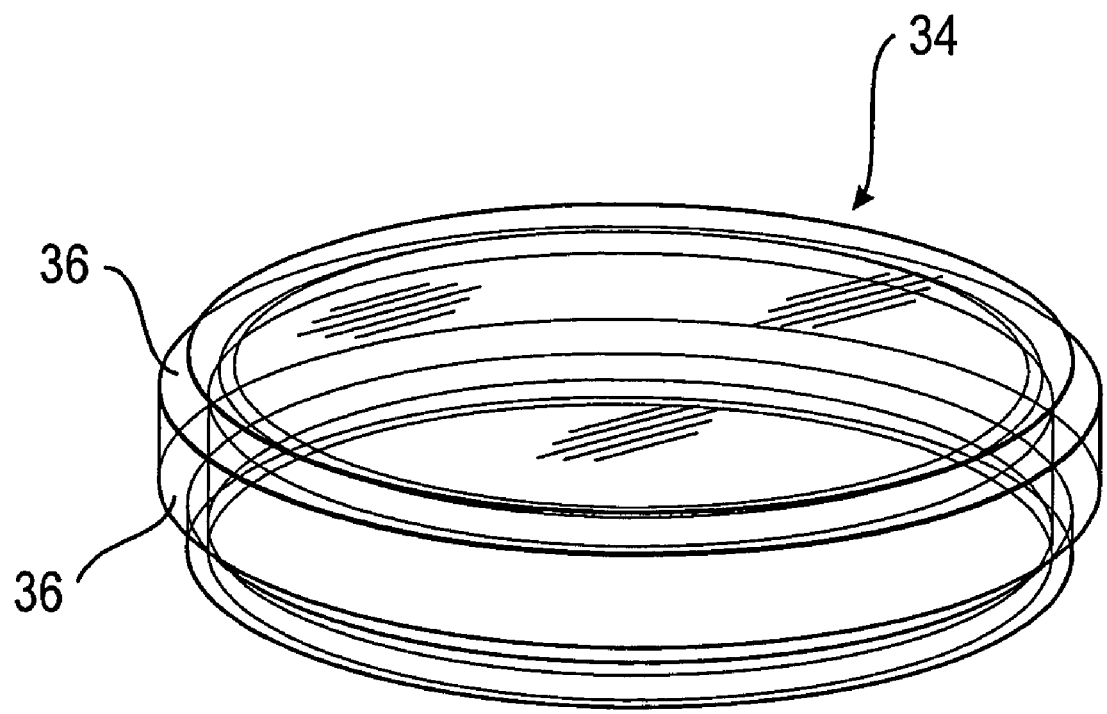
FIG. 16 shows the injection-molded member of the third assembly.

This assembly is distinguished in that the light of the LEDs 24 is coupled in through suitably arranged deflection surfaces 22 laterally past the support 14 and the emblem 10 into the transparent injection-molded member 34, as shown in FIGS. 14 and 15. In the injection-molded member 34, a deflection takes place at its bevels 36 (see FIG. 16). The light which is (at least partially) reflected on the inner surface of the injection-molded member then illuminates the emblem 10.

In the case of an emblem 10 which is not contiguous (i.e. if it has gaps), the light can (additionally) be coupled in between the emblem structures into the transparent injection-molded member 34. In this case, corresponding gaps are provided in the support 14.

A further illumination design is shown in FIG. 17. Here, the assembly comprises a transparent support 14 which is illuminated from one side by one or more LEDs 24. The other side of the support 14 is structured in accordance with the overlying opaque emblem 10. The light can therefore only emerge through the elevated structures 38 of the support surface. (It is not absolutely necessary for the structures 38 to be elevated though.)

As indicated in the left half of FIG. 17, the light can also be coupled in from the side into the transparent support 14. The surface of the support 14 which is not visible can be coated with a reflection foil 40 or a reflecting enamel. The elevated structures 38 of the visible surface can be printed in order to achieve a particular illumination effect.

The illumination design illustrated in FIG. 18 is similar to the one previously described. Here, the support and emblem are exchanged, i.e. the support 14 is arranged on the side facing the observer and the emblem 10 has elevated structures 38. Accordingly, the emblem 10 is transparent here and the support 14 is opaque. The elevated structures 38 of the emblem 10 are PVD-coated in the manner of a Venetian mirror (one-way mirror). The light of the LEDs 24 enters into the emblem 10 from the side facing away from the observer and can emerge through the elevated structures 18. Conversely, however, the observer can not see through the PVD coating.

A final illumination design is shown in FIG. 19. A transparent support 14 has elevated structures which correspond to the positive or negative logo 12 which is to be displayed illuminated. The support 14 is injection-molded around with a transparent plastic 34, so that the logo structure is protected. The light of one or more LEDs 24 is coupled in from the other side into the support 14. The support 14 is printed black on the side facing the observer, with the exception of the elevated structures 38, so that no light can emerge there. The elevated structures 38, on the other hand, are printed in color and are transparent, so that the logo 12 appears to be illuminated in color.

The embodiments which are described by way of example show a range of measures for the illuminated display of a logo 12, which are also able to be combined with each other.

The invention claimed is:

1. An airbag cover in a motor vehicle, comprising an assembly for illuminated display of a logo in a motor vehicle, the assembly including a support and at least one light source which is arranged behind or adjacent to the support.

2. The airbag cover according to claim 1, comprising an emblem representing the logo.

3. The airbag cover according to claim 2, wherein the emblem is opaque.

4. The airbag cover according to claim 3, further comprising a photoconductor having light deflection surfaces which direct light of the light source onto a rear side of the emblem.

5. The airbag cover according to claim 4, wherein the photoconductor has a light outlet area which lies opposite rear edge regions of the emblem.

6. The airbag cover according to claim 5, wherein the light outlet area does not project laterally over the rear edge regions of the emblem.

7. The airbag cover to claim 4, wherein edge regions of the emblem do not directly adjoin the photoconductor.

8. The airbag cover according to claim 4, wherein the support is an opaque article produced by injection molding around the photoconductor.

9. The airbag cover according to claim 4, wherein the light source is arranged on a printed circuit board which is held in a base of the assembly.

10. The airbag cover according to claim 4, comprising a diffusor for scattered coupling in of light of the light source into the photoconductor.

11. The airbag cover according to claim 10, wherein the light source is arranged centrally under the logo, the diffusor being arranged directly over the light source.

12. The airbag cover according to claim 2, wherein the emblem is arranged partially behind the support and is transparent.

13. The airbag cover according to claim 12, wherein the support is opaque.

14. The airbag cover according to claim 13, wherein the emblem has elevated structures which are raised up from the support.

15. An assembly for illuminated display of a logo in a motor vehicle, the assembly including a support and at least one light source which is arranged behind or adjacent to the support, wherein the light source includes an electroluminescence foil, the support being arranged between the electroluminescence foil and the logo and being transparent.

16. The assembly according to claim 15, wherein a surface of the support facing the logo is coated with an opaque enamel, the enamel having gaps at specific sites.

17. An assembly for illuminated display of a logo in a motor vehicle, the assembly including a support and at least one light source which is arranged behind or adjacent to the support, wherein the support is transparent and structured on a side facing the logo corresponding to one of the logo and an emblem representing the logo.

18. The assembly according to claim 17, wherein an opaque emblem lies on the transparent support.

19. The assembly according to claim 17, wherein the support has elevated structures on the side facing the logo.

20. The assembly according to claim 17, wherein the side of the support facing the logo is partially printed.

21. The assembly according to claim 17, wherein light of the light source is coupled in laterally into the support.

22. The assembly according to claim 17, wherein a surface of the support facing the logo is coated with one of a reflection foil and a reflecting enamel.

23. An assembly for illuminated display of a logo in a motor vehicle, the assembly including a support and at least one light source which is arranged behind or adjacent to the support, wherein a transparent plastic injection-molded member is arranged over the logo, into which light of the light source is coupled in.

24. The assembly according to claim 23, wherein the light of the light source is coupled in at least one of a) laterally past the logo and b) between logo structures into the transparent plastic injection-molded member.

25. The assembly according to claim 24, wherein the transparent injection-molded member has light-deflecting bevels.

26. An assembly for illuminated display of a logo in a motor vehicle, the assembly including an opaque support, at least one light source which is arranged behind or adjacent to the support, and a transparent emblem representing the logo, wherein the emblem is partially PVD-coated and is arranged partially behind the support.

27. An assembly for illuminated display of a logo in a motor vehicle, the assembly including a support and at least one light source which is arranged behind or adjacent to the support, wherein the support is transparent and has structures representing the logo.

28. The assembly according to claim 27, wherein the support is one of printed and coated so as to be opaque on a side facing an observer, with exception of the structures.

29. The assembly according to claim 27, wherein the structures are transparent and one of printed and coated so as to be colored.

30. The assembly according to claim 27, wherein the support is injection-molded around with a transparent plastic.

31. An assembly for illuminated display of a logo in a motor vehicle, the assembly including a support and at least one light source which is arranged behind or adjacent to the support, wherein a visible transparent part of the assembly is at least partially PVD-coated.

* * * * *